(12) United States Patent  (10) Patent No.: US 8,294,313 B2
Frank et al.  (45) Date of Patent: Oct. 23, 2012

(54) ELECTRIC MACHINE AND METHOD FOR DETERMINING THE AXIAL POSITION OF BEARINGS FOR A ROTOR OF THE MACHINE

(75) Inventors: Michael Frank, Uttenreuth (DE); Peter van Haßelt, Erlangen (DE)

(73) Assignee: Siemens Aktiengesellschaft, München ( * ) Notice: Subject to any disclaimer, the term of this patent is extended or adjusted under 35 U.S.C. 154(b) by 0 days.

(21) Appl. No.: 13/097,354

(22) Filed: Apr. 29, 2011

(65) Prior Publication Data

US 2012/0102723 A1   May 3, 2012

Related U.S. Application Data

(62) Division of application No. 12/163,344, filed on Jun. 27, 2008, now Pat. No. 7,936,101.

(30) Foreign Application Priority Data

Jun. 29, 2007 (DE) .......................... 10 2007 030 411

(51) Int. Cl.
  *H02K 5/16* (2006.01)
  *H02K 7/08* (2006.01)

(52) U.S. Cl. ................................. 310/90; 310/61; 29/593
(58) Field of Classification Search .............. 310/52–64, 310/90, 90.5; 29/593, 596–598
See application file for complete search history.

(56) References Cited

U.S. PATENT DOCUMENTS 6,351,045 B1 * 2/2002 Shoykhet ........................ 310/52
* cited by examiner

*Primary Examiner* — Quyen Leung
*Assistant Examiner* — Leda Pham

(57) ABSTRACT

An electric machine contains a rotor which contains a first longitudinal section at the ambient air temperature and a second longitudinal section cooled at least partially to cryogenic temperature, a coolant inlet pipe extending into the second longitudinal section, wherein the inlet pipe is set at a distance from the rotor by a radial gap, wherein the inlet pipe in the first longitudinal section is mounted by at least two bearings, wherein the bearings are distributed on axial positions in such a way that upon action of a maximum radial force on the inlet pipe the pipe has a maximum deflection which is smaller than the radial gap. In a method for determining the axial positions, various batches of potential locations are chosen for the axial positions of the bearings, according to potential locations which has a minimum gap greater than zero.

2 Claims, 2 Drawing Sheets

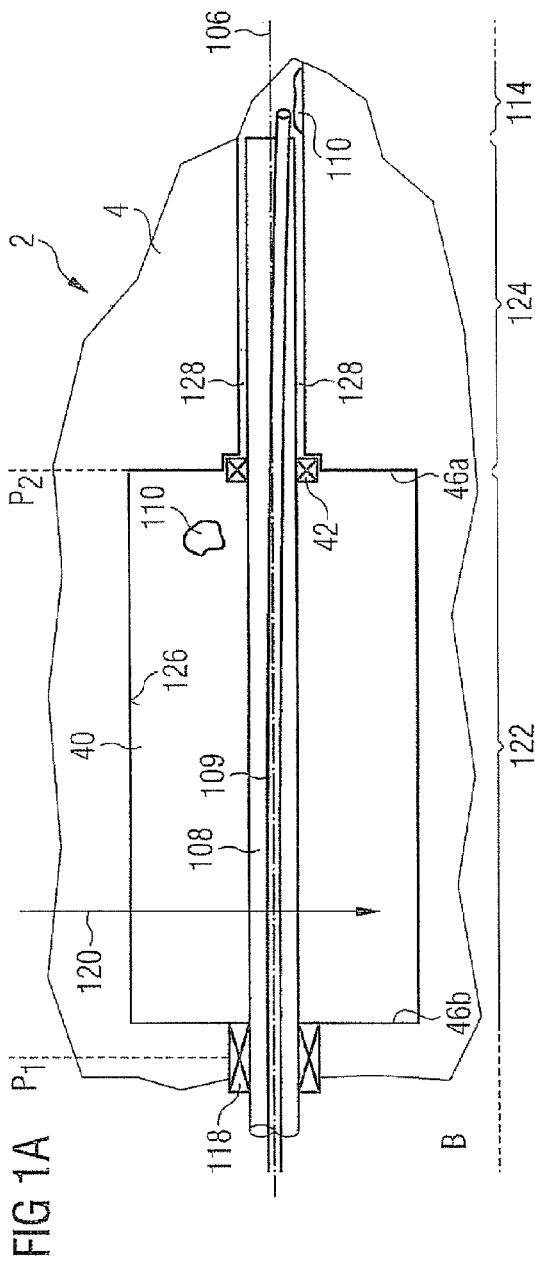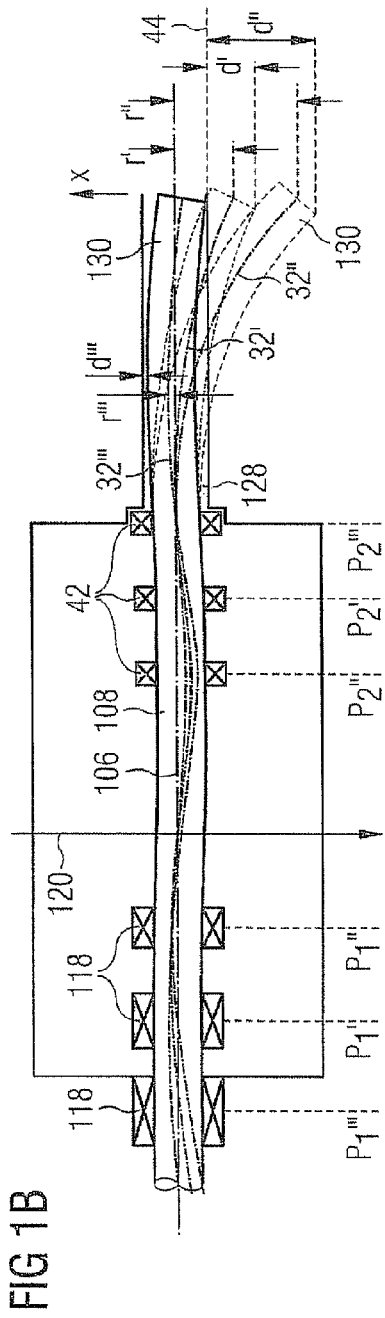

ELECTRIC MACHINE AND METHOD FOR DETERMINING THE AXIAL POSITION OF BEARINGS FOR A ROTOR OF THE MACHINE

CROSS REFERENCE TO RELATED APPLICATIONS

This is a divisional application of U.S. patent application Ser. No. 12/163,344, filed Jun. 27, 2008 now U.S. Pat. No. 7,936,101 which claims the benefits of German application No. 10 2007 030 411.2 filed Jun. 29, 2007 and is incorporated by reference herein in its entirety.

FIELD OF INVENTION

The invention concerns an electric machine with a rotor with superconducting rotor winding, and a method for determining the axial position of at least two bearings for the rotor in the electric machine.

BACKGROUND OF THE INVENTION

Electric machines, in particular those with high power, can be equipped with superconducting rotor windings today. These kinds of synchronous machines require a cooling system in order to cool the rotor winding down to the operating temperature. A conventional specification of these kinds of cooling systems uses a so-called cooling tube in order to transfer liquid coolant from a thermosiphon system to the rotating machine and to return the evaporated coolant to the condenser. The end of a cooling tube like this, at room temperature, is conventionally introduced into the rotor of the rotating machine with a single bearing, e.g. combined with a hermetically-sealing rotary joint typically sealed with ferrofluid, or located there. The rotor is hereby designed as a hollow shaft, at least in the area of the cooling tube. The cooling tube therefore runs centrally and coaxially to the central longitudinal axis of the rotor. Between the cooling tube and the inner wall of the hollow shaft, or rather the rotor, a radial gap exists. As a rule, the cooling tube is idle and the rotor rotates around the cooling tube.

Depending on the material used and the length and diameter-dependent rigidity of the cooling tube, the free, cold end of the cooling tube which reaches into the machine or into the area of the rotor winding typically sags down a few fractions of a millimeter under its own weight, i.e. in the direction of gravitational force. In known machines, the size of the radial gap is dimensioned today in such a way that the static bending of the cooling tube in the direction of gravity does not represent a problem, i.e. the cooling tube does not touch the rotating shaft.

FIG. 2a shows in section, strongly abstracted, a section from an electric machine 102 according to the prior art, of which an axial segment of the rotor 104, which can be rotated around its central longitudinal axis 106, can be seen. A cooling tube 108, which is evacuated for thermal isolation, runs centrically in the rotor 104 along the central longitudinal axis 106. A conduit 109 is attached in the interior of the cooling tube 108, e.g. welded in firmly, for the transport of neon 110 as a coolant. The neon 110 in liquid form goes in the direction of the arrow 112 from the B-side B of the machine 102 into its interior, namely into the area 114 cooled in operation to a cryogenic temperature, the area which contains the superconducting rotor winding 116.

Cooling tube 108 and conduit 109 rest stationary relative to the surroundings, in particular relative to the rotor 104 rotating in operation. The cooling tube 108 is therefore mounted by a single gastight rotary joint 118 in the rotor so it can be rotated around the central longitudinal axis 106. The conduit 109 slopes slightly from the B-side B to the area 114 in the direction of gravitation, namely in the direction of the arrow 120. The axial section 122 of the machine 102 is at the ambient air temperature, the axial section 124 has a temperature range from the ambient air temperature of the section 122 to the cryogenic temperature of the area 114.

The cooling tube 108 is set at a distance form the inner wall 126 of the rotor 104 by a radial gap 128. Gaseous neon 110 flows against the direction of the arrow 112, out of the area 114 back to the B-side B of the machine 102, and from there to a condenser (not shown), in order to be re-liquefied there. The length of the area 124 in the axial direction of the central longitudinal axis 106 comes to approx. 0.5 to 1.5 meters.

The machine 102 is mounted on a vehicle (not shown), e.g. a ship. FIG. 2a shows the machine 102 in normal operation, i.e. when the vehicle is at rest or in quasi-static motion. The force of gravity then acts solely in the direction of the arrow 120.

However, in intended future uses for electric machines with superconducting rotors, e.g. on ships used by the military, shock loads of approx. twelve times the acceleration due to gravity, i.e. 12 g, can arise for the machine. The shock load is to be taken here as quasi-static, i.e. as though twelve times the earth's gravitational force were acting in a sustained basis. Dynamic procedures are not considered. As a result of these kinds of shock loads, the deflection of the cooling tube increases correspondingly, which would lead to a contact between cooling tube and rotating rotor in machines known today. A contact between cooling tube and hollow shaft must be avoided, however, at all costs, in order to avoid damage to the machine.

FIG. 2b shows the machine 102 from FIG. 2a under such a shock load. The conduit 109 has been left out for reasons of visibility. The force of e.g. twelve times the acceleration due to gravity 12 g acts in the direction of the arrow 120. The free end 130 of the cooling tube 108 experiences a strong deflection in the direction of the arrow 120 due to its own weight, and strikes against the inner wall 126 or even into it, which leads to substantial damage or even destruction of the machine 102. Hence the radial gap 128 disappears at the location of the impact. A deflection line 130 arises for the cooling tube 108, a line which deviates downwards from the central longitudinal axis 106, so in the direction of gravitational force of the arrow 120.

Methods of resolution available today for this problem are based on a reduction in the length of the cooling tube or in the length of the free end, and/or the enlargement of the radial gap between cooling tube and hollow shaft. However, both measures raise the undesired thermal load introduced into the area cooled to a cryogenic temperature. On the one hand, the heat conduction through the cooling tube is itself raised, namely because of the shorter overall length. On the other hand, the heat emission transferred from the warm to the cold end in the enlarged radial gap, i.e. the gap between hollow shaft (neck pipe) and cooling tube, increases. Through a larger radial gap or a shorter length of it, circulation of the working gas inside the gravity-driven convection cell established there is facilitated.

A mounting of the free end of the cooling tube in the rotor would also be possible in principle, however this end is at a cryogenically low (rotor) temperature and conventional mounting in this location is rejected. An inexpensive, direct mounting with a conventional bearing is therefore not possible. A cost-intensive mounting by means of a superconducting magnetic bearing is known, for example, from DE 103 58 341 A1.

SUMMARY OF INVENTION

The object of the invention is to indicate an improved electric machine which is suited to shock loads, or rather a method for the production of this.

The invention is based on the insight of introducing an additional bearing outside the critical—cooled—area, i.e. in the area of the ambient air temperature, in order to secure the cooling tube suitably, so that ultimately the deflection in the radial direction is reduced at least in the critical cryogenic area, namely the area of the free end.

With regard to the machine, the object is solved by an electric machine with a rotor, wherein the rotor has a first longitudinal section which is at the ambient air temperature all the time, i.e. even during operation. The rotor furthermore has a second longitudinal section axially attached to the first, which is cooled to a cryogenic temperature during operation of the electric machine. The electric machine furthermore contains a coolant inlet pipe running along the central longitudinal axis of the rotor, a pipe which goes through the first longitudinal section and extends into the second longitudinal section. The inlet pipe is hereby set at a distance from the rotor, at least in the second longitudinal section, by a radial gap, or rather encompassed by the rotor. According to the invention, the inlet pipe in the first section is mounted in the rotor so it can be rotated by at least two bearings at different axial positions. The bearings are thereby allocated to axial positions such that, upon exposure to a maximum radial force corresponding to a maximum possible shock load, this effected a maximum deflection on the inlet pipe, a deflection which is, however, even smaller than the radial gap.

As a rule, the second longitudinal section is not cooled to a cryogenic temperature over its whole length, but rather represents the transition area between ambient air temperature and cryogenic temperature based on the first section.

Given that, upon suitable embodiment of the double bearing, the deflection, i.e. the deviation of the outer edge of the cooling tube from the central position, is smaller than the radial gap, there remains a residue of radial gap between cooling tube and rotor. A contact of the two parts up to the maximum shock load is out of the question.

The bearings thereby form a device for the reduction of the maximum deflection of the cooling tube and are located in the first longitudinal section, so at the ambient air temperature, because of which inexpensive, conventional bearings can be used. By multiple mounting in the first longitudinal section to corresponding suitable axial positions, the deflection line of the inlet pipe upon action of the radial force on it is also influenced in the second longitudinal section, due to its inherent stability. By introduction of the minimum two cooling tube (or inlet pipe) bearing points, possibly even several bearing points, wherein two bearings in total are preferred, it is possible to form the deflection line of the cooling tube caused by gravity or shock load, i.e. acting in the radial direction, in such a way that in the critical area, i.e. in the area of the length of the cooling tube hanging free, the maximum deflection is substantially reduced in comparison with the original, simple mounting known in the prior art.

On the basis of simulations, or rather calculations, for realistic measurements of a cooling tube, or rather of an electric machine, a reduction of the maximum cooling tube deflection in the critical area, i.e. in the second longitudinal section, can be reduced by e.g. an order of magnitude. When taking the measure of introducing further bearing points, it is therefore possible, in a simple and inexpensive way, to reduce the deflections of the cooling tube (or the inlet pipe) which have been increased by approx. an order of magnitude in the critical area (i.e. the second longitudinal section) back to the previous extent, i.e. to reduce the deflection of a simply mounted inlet pipe with simple force of gravity.

In electric machines with cooling tube dimensions typically used there, a clearly increased shock resistance for the electric machines can be directly achieved in this way, i.e. by introducing additional bearing points without further measures like constructive alteration of the inlet pipe, rotor or radial gap.

The axial positions of the bearings can be determined e.g. on the basis of an analytic calculation, or also on the basis of an iterative calculation, of the deflection line of the inlet pipe upon action of the radial force. The iterative calculation can hereby take place e.g. in such a way that, initially, potential axial positions for the bearing are chosen according to empirical values, randomly, evenly distributed axially or according to any other criteria. Next the deflection line for the chosen configurations of potential bearing points is determined. The potential axial positions of one or several bearings can then in turn be altered, or a new deflection line determined etc., according to empirical values etc. on the basis of the determined course of the deflection line. This can be carried out for as long as it takes until the maximum deflection of the inlet pipe is smaller than the radial gap, so that the machine remains undamaged upon shock load.

The radial gap can stretch out on the first longitudinal section and be extended to a buffer chamber on at least one part of the first section. The bearings can then be arranged axially on both ends of the buffer chamber. This kind of buffer chamber is known e.g. from the non-pre-published DE patent application 10 2007 030 474 DE (date of application: Jun. 29, 2007) with the title "Electric machines with superconducting rotor winding", and serves in the procurement of gaseous coolants in the interior of the electric machine, or rather the rotor, or rather as a replacement for an external gas pressure reservoir. An additional radial mounting, to increase the shock resistance of the electric machine, can therefore be combined without problems with an embodiment of the machine with an integrated buffer chamber in the rotor. By attaching bearings onto each of the axial ends of the buffer chamber, where as a rule the rotor interior diameter projects back up to a narrow radial gap until the inlet pipe, the mechanically stable attachment of a bearing in the rotor can be clearly simplified in comparison with a bearing in the area of the radially extended buffer chamber, which would make a clearly larger bearing or a radial clamping of a smaller bearing in the rotor necessary.

At least one of the bearings can be a gastight rotary joint. A single gastight rotary joint suffices to seal the interior of the rotor, which is filled with the working gas or with the coolant, against the exterior space. The remaining bearings can be permeable to gas; upon use of a buffer chamber this even has to be the case, in order to make possible a flow of coolant in the axial direction between buffer chamber and the rest of the cooling system outside the cooling tube.

The first longitudinal section can be facing the B-sided end of the rotor. In electric machines with thermosiphon systems and central inlet pipes in the rotor, the B-side of the machine which is simply used as support for the rotor is the conventional point of delivery for the cooling system.

The inlet pipe can be inactive during operation, as mentioned above. This is also a conventional embodiment for machines with superconducting rotors.

With regard to the method, the object according to the invention is solved by a method for determining the axial position of at least two bearings for a rotor of an electric machine, wherein the rotor contains a first longitudinal section, at the ambient air temperature during operation, and a second longitudinal section which is axially connected to the first section and is at least partially cooled to a cryogenic temperature during operation, with a coolant inlet pipe running along the central longitudinal axis of the rotor, going through the first longitudinal section and extending into the second section, wherein the inlet pipe is set at a distance from the rotor by a radial gap, in which the inlet pipe is mounted in the rotor in the first section by the bearing in different axial positions so it can be rotated.

In methods according to the invention, various batches of potential locations are chosen for the axial positions of the bearings. This is done e.g. at random, according to empirical values, according to the experience of a machine design engineer etc. For every particular batch of potential bearing positions, the deflection of the inlet pipe is then determined upon action of radial force on the inlet pipe. In turn, the remaining minimum gap between inlet pipe and rotor is determined from the deflection line. This minimum gap is zero or even negative when the inlet pipe and rotor are touching, if the cooling tube were to penetrate into the rotor, at least arithmetically. A minimum gap larger than zero means a residual radial gap. Chosen for the bearing are those axial positions which come from the batches of potential locations which delivered a minimum gap of larger than zero in the previous determination of the gap.

The method according to the invention ensures that, in the end, an electric machine will be obtained in which the inlet pipe has a maximum deflection, when the maximum radial force is acting upon it, which is smaller than the radial gap.

In order to obtain the largest safety margin possible, the actual axial positions of the bearing can be chosen from the batch of potential locations which has the largest minimum gap in the determination of value mentioned above. The batch of potential locations for the axial positions of the bearing to be chosen, then, is the one in which the residual radial gap between inlet pipe and rotor is still maximum when the inlet pipe is deflected, i.e. during action of force.

BRIEF DESCRIPTION OF THE DRAWINGS

Reference is made to the exemplary embodiments in the drawings for a further description of the invention. These show, in each case in a schematic diagram:

FIG. 1 an electric machine with multiple mounting of the rotor (a) when idle and (b) under shock load, FIG. 2 an electric machine according to the prior art (a) when idle and (b) under shock load.

DETAILED DESCRIPTION OF INVENTION

Figures 2A, 2B:
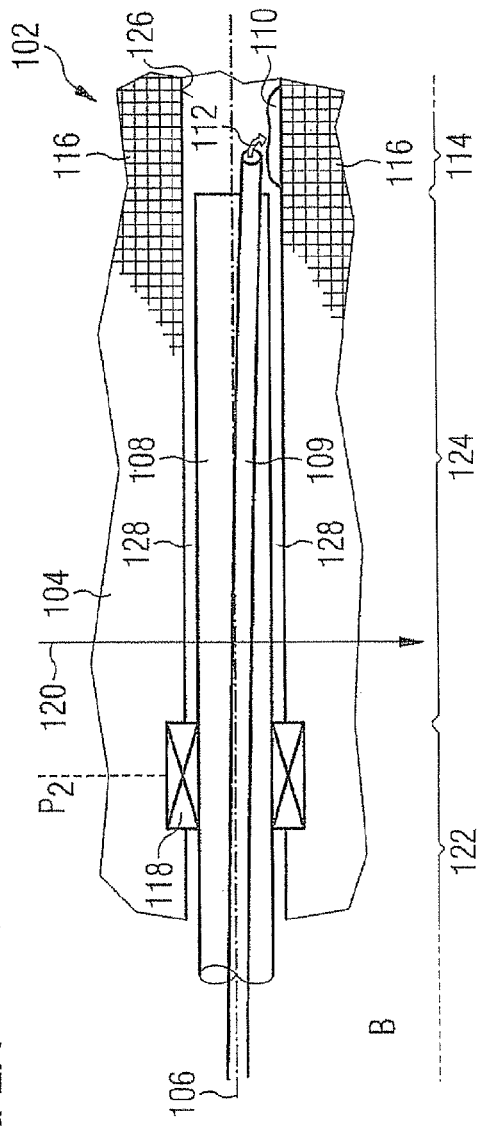

FIG. 1a shows a machine 2 according to the invention, of which a larger section on the B-side B is shown than in FIGS. 2a,b. In comparison to FIGS. 2a,b, in FIG. 1a the rotor 4 is hollowed out in the section 122, or rather its interior diameter is extended, in order to form a cavity 40. The cavity 40 serves in the storage of working gas, gaseous neon 110, when the machine 2 is idle, if the whole machine 2 is heated to the surrounding air temperature. A corresponding cavity 40 is described in detail in the non-pre-published DE patent application 2007P05926 DE (date of application: Jun. 29, 2007) with the title "Electric machine with superconducting rotor winding". In comparison to FIGS. 2a,b, the gastight rotary joint 118 is shifted in the direction of the B-side B onto the axial position P1. On their original position according to FIGS. 2a,b, namely the axial position P2, the cooling tube 108 is replaced by a gas-permeable bearing 42. Rotary joint 118 and bearing 42 are therefore located on the ends 46a,b of the cavity 40. Gaseous neon 110 can diffuse through the bearing 42, between the cavity 40 and the area 114, through the radial gap 128. The machine 2 is, in turn, mounted on a vehicle (not shown) e.g. a ship. FIG. 1a shows the machine 2 when the vehicle is idle, or in quasi-static motion, i.e. the simple force of gravity acts in the direction of the arrow 120.

FIG. 1b in turn shows the machine 2 according to the invention upon the action of a shock load, of e.g. twelve times the acceleration due to gravity, on the vehicle, in the direction of the arrow 120. However, a completely different deflection line 32 emerges in comparison to FIG. 2b due to the doubled mounting of the cooling tube 108 in the rotary joint 118 and in the bearing 42. This follows in section 122 of the force of gravity, i.e. of the direction of the arrow 120, which is why it proceeds against the arrow 120 initially upwards, and only back in the direction of the arrow 120, i.e. downwards, at the free end 130 of the cooling tube 108, because of the inherent stability of the cooling tube 108 on the other side of the brace support through the bearing 42, i.e. in the area 124, due to the inherent stability of the cooling tube. Overall, the undulating deflection line 32 leads to the radial gap 128 being retained in the whole section 124, i.e. the cooling tube 108 does not touch the rotor 4.

Hence the machine 2 is only able to cope with the shock load, in comparison with FIGS. 2a,b, by insertion of the additional mounting for the cooling tube 108 on the axial position P1, and without other constructional alterations to the machine 102.

The chamber 40, through which the machine 2 can likewise be distinguished from the machine 102, can also be left out, which distinguishes the machines 2 and 102 simply in terms of the mounting to the axial positions P1 and P2.

Determination of the bearing positions P1 and P2 is carried out by calculation. FIG. 1b shows three potential axial positions $P_{1,2}'$, $P_{1,2}''$ and $P_{1,2}'''$ for the bearings 118 and 42. For each of these axial positions a deflection line 32', 32'' and 32''' with the potential location of the corresponding ends 130 of the cooling tube 108 is calculated in a computer simulation. There is contact between cooling tube 108 and rotor 4 in the area 124 with the end 130 for the deflection lines 32' and 32''. The particular minimum gap between rotor 4 and cooling tube 108 with regard to the zero line 44 in the direction x is then negative and comes to d'=−3 mm, d''=−6 mm. A value of d'''=1 mm is generated for the axial positions $P_{1,2}'''$. The deflection r','',''' is the particular maximum gap of the deflection line 32','','''' from the central longitudinal axis 108.

Hence the potential axial positions $P_{1,2}'''$ are those which deliver the minimum deflection r''', and the only ones which deliver a positive gap d''' from cooling tube 108 and rotor 4, or its interior wall 126, i.e. a residual radial gap 128. These potential axial positions $P_{1,2}'''$ are therefore also chosen as actual axial positions $P_{1,2}$, upon which the bearings 118 and 42 are introduced upon construction of the machine 2.

The invention claimed is:

1. A method for determining the axial position of a plurality of bearings for a rotor of an electric machine, wherein the rotor contains a first longitudinal section at the ambient air temperature during operation, and a second longitudinal section which is axially connected to the first section and is at least partially cooled to a cryogenic temperature during operation, with a coolant inlet pipe running along the central longitudinal axis of the rotor, going through the first longitudinal section and extending into the second section, wherein the inlet pipe is set at a distance from the rotor by a radial gap, in which the inlet pipe is mounted in the rotor in the first section by the bearings in different axial positions for rotation, comprising:

choosing various batches of potential locations for the axial positions of the bearings;

determining the deflection line of the inlet pipe upon action of radial force for the particular batch of potential locations;

determining the minimum gap between the inlet pipe and rotor based on the determined deflection line;

determining the axial positions according to one of the batches of potential locations which has a minimum gap greater than zero.

2. The method as claimed in claim 1, wherein the axial positions are determined according to the batch of potential locations which has the largest minimum gap.

* * * * *